No. 711,077. Patented Oct. 14, 1902.
F. SCHMITZ.
ELASTIC HUB AND AXLE FOR BICYCLES, &c.
(Application filed June 24, 1901.)

(No Model.) 2 Sheets—Sheet 1.

Witnesses:
Chas. O. Shurvey
S. Bliss

Inventor:
Frank Schmitz
by Wilkinson & Bitner
Attys.

THE NORRIS PETERS CO., PHOTO-LITHO., WASHINGTON, D. C.

No. 711,077. Patented Oct. 14, 1902.
F. SCHMITZ.
ELASTIC HUB AND AXLE FOR BICYCLES, &c.
(Application filed June 24, 1901.)
(No Model.) 2 Sheets—Sheet 2.
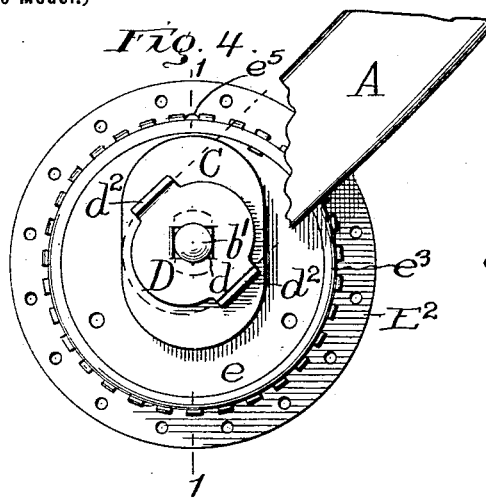
Fig. 4.
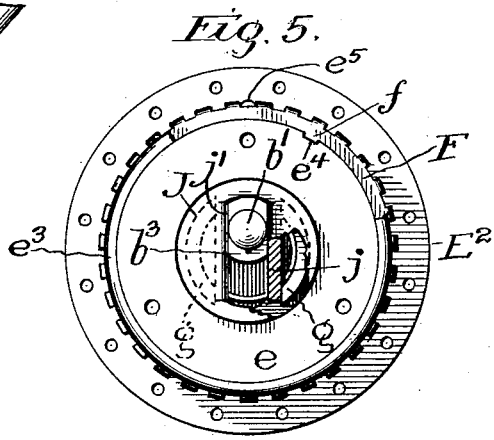
Fig. 5.
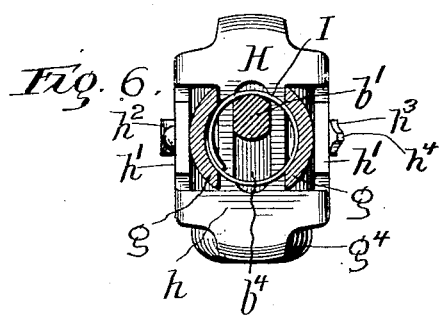
Fig. 6.
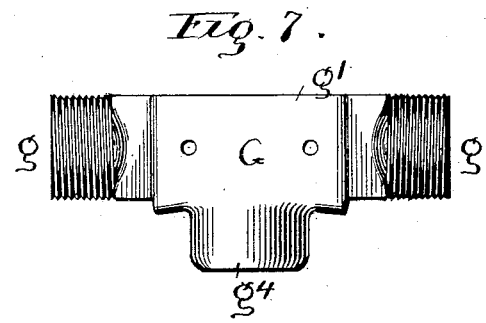
Fig. 7.
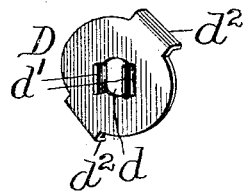
Fig. 8.
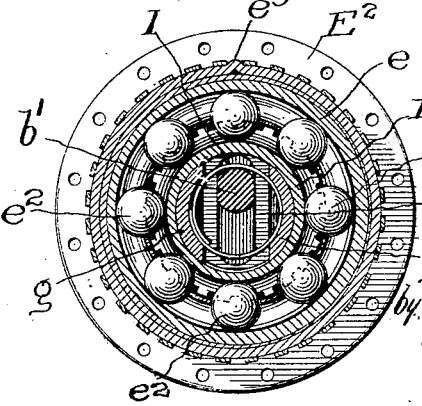
Fig. 9.
Fig. 10.
Witnesses:
Chas. O. Shurvey
S. Bliss.
Inventor:
Frank Schmitz
by Wilhelm Greene & Petner
Attys.
THE NORRIS PETERS CO., PHOTO-LITHO., WASHINGTON, D. C.

UNITED STATES PATENT OFFICE.

FRANK SCHMITZ, OF CHICAGO, ILLINOIS.

ELASTIC HUB AND AXLE FOR BICYCLES, &c.

SPECIFICATION forming part of Letters Patent No. 711,077, dated October 14, 1902.

Application filed June 24, 1901. Serial No. 65,733. (No model.)

*To all whom it may concern:*

Be it known that I, FRANK SCHMITZ, a citizen of the United States of America, residing at Chicago, in the county of Cook and State of Illinois, have invented certain new and useful Improvements in Elastic Hubs and Axles for Bicycles and the Like, of which the following is a specification.

My invention relates to certain improvements in elastic hubs and axles for bicycles and the like in which a spring is interposed between the hub and axle to give the axle a certain limited amount of elastic movement, thereby preventing unpleasant vibration and jarring to the frame.

This invention has reference more especially to the guiding of the various parts and adjustability thereof and to certain other novel features of construction, a description of which will be found in the following specification and the essential features more definitely pointed out in the claims.

Figure 1:
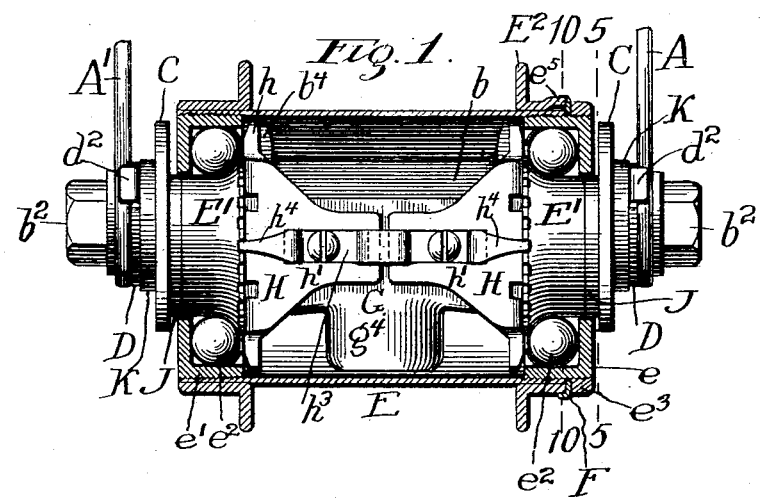
Figure 2:
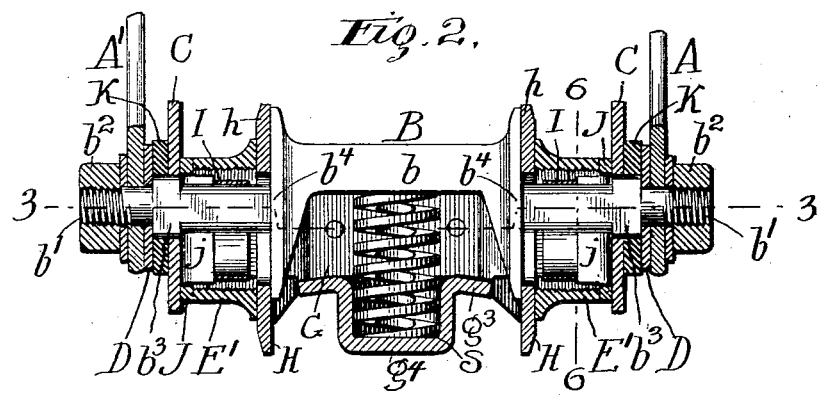
Figure 3:
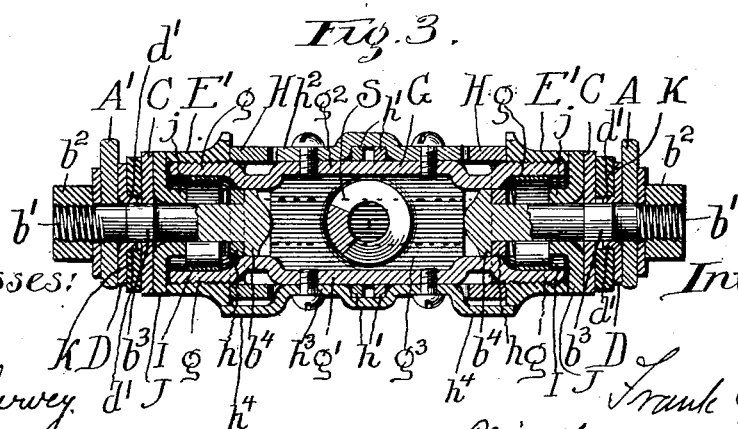

In the drawings furnished herewith, Figure 1 is a front view of my improved device applied to the fork of a bicycle with the hub-casing and bearing-cups in central vertical section, the line of section being indicated at 1 1 in Fig. 4. Fig. 2 is a central vertical longitudinal section through the device with the axle in side elevation, the section being taken in the same line. Fig. 3 is a horizontal section taken in the broken line 3 3, Fig. 2. Fig. 4 is a side elevation of the parts seen in Fig. 1 with the fork broken away. Fig. 5 is a similar view with all the removable parts taken off from the line 5 5 of Fig. 1. Fig. 6 is a vertical cross-section in the line 6 6 of Fig. 2. Fig. 7 is a side view of the axle-case. Fig. 8 is a perspective view of a clip for holding the axle in proper relation to the fork. Fig. 9 is a perspective view of a washer used in the device, and Fig. 10 is a cross-section in the line 10 10 of Fig. 1.

Referring to the drawings, A A' represent the two members of an ordinary bicycle-fork, in the ends of which is secured the axle B. Said axle consists, preferably, of a central yoke-shaped portion $b$, from the legs $b^1$ of which extend longitudinal spindles $b'$ $b'$, screw-threaded upon their ends to receive the nuts $b^2$. Said spindles are formed with transversely-extending lugs $b^3$, flattened upon their sides, adapted to receive elongated washers C, and resting against these lugs are clips D D, Fig. 8, perforated at $d$ to slip upon the spindles and having inwardly-projecting tangs $d'$ $d'$ embracing the sides of the lugs $b^3$ to prevent their turning upon the spindles. Upon their edges are outwardly-extending tangs $d^2$ $d^2$, adapted to embrace the edges of the forked members, so as to properly position the axle with respect thereto, and it is evident that when the nuts $b^2$ are screwed up tight the axle will be rigidly secured in place upon the forks without danger of turning or otherwise getting out of the proper relation therewith. The hub-casing is seen at E and is provided with the ordinary cups or ball-races $e$ $e'$ to receive antifriction-balls $e^2$, which roll upon the bearing-cones E', which are connected to the axle B, as will be hereinafter described. The cups are threaded in the casing, and the cup $e$ is adjustable toward the balls to take up the wear, a lock-nut $e^3$ being provided to lock the same in place.

Looking at Figs. 1 and 5, a washer F will be seen interposed between the lock-nut and the hub-casing, said washer having a tongue $f$ seated in a groove $e^4$ in the bearing-cup $e$ to prevent rotation of the washer with respect to the cup. Said washer F is toothed or serrated upon its periphery, and its rotation with respect to the hub-casing is prevented by a rib $e^5$, Fig. 10, which is adapted to lie in any of said spaces between two adjacent teeth. This rib is formed in the ring $E^2$, to which the spokes are secured before said ring is secured upon the hub-casing. The bearing-cup $e$ may evidently be adjusted to place, the washer F slipped thereupon with the tongue in the groove $e^4$ and the rib $e^5$ between two adjacent teeth, after which the parts may be securely locked together by the lock-nut $e^3$.

The cones E', above referred to, are screwed upon the screw-threaded ends $g$ of an axle-case G, Figs. 3, 7, and 10, which is preferably made up of two sides $g'$ $g^2$, united by a bottom $g^3$, extending only a portion of its length and having a downwardly-extending socket $g^4$ to receive a compression-spring S, the other end of which presses against the yoke-shaped portion $b$ of the axle, Fig. 2, to yieldingly support the same. Said axle is guided in the axle-case by means of guide-plates H, having end portions $h$, upon which the legs $b^4$ of the axle bear, and side portions $h'$, extending along the sides of the axle-case and secured to the sides thereof by two clips $h^2$ $h^3$, seated in slots in the sides of the guide-plates and screwed to the sides of the axle-box. The sides of the legs $b^4$ are vertically guided between the sides of the axle-case, as clearly seen in Fig. 3, to prevent lateral movement or oscillation of the axle-case upon the axle. The ends $h$ of said guide-plates are vertically slotted to permit the axle to play therein and the screw-threaded ends of the axle-case to project therethrough. The bearing-cones $E'$ being screwed upon the ends of the axle-case extending without the guide-plates H may be screwed up against the end portions $h$ thereof and locked in place by fingers $h^4$, Fig. 1, upon the clip $h^3$, the bearing-cones being provided with serrations for engagement with the fingers $h^4$. To prevent clicking or chattering of the parts, an elastic or spring ring I has been provided, Fig. 6, which is seated within the ends $g$ of the axle-case and adapted to receive the impact of the spindles $b'$ of the axle. As seen in Fig. 6, each of these rings is formed of spring-steel bent into the shape of a ring, with its outer ends overlapping, so that one may slide upon the other. By this arrangement these spring-rings are held snugly in the ends of the axle-box, so that they will not rattle therein. When the spindles of the axle strike the rings, the shock is taken up thereby, and the ends of the rings slide a little upon each other as they are distended. Washers J are placed against the cones $E'$, said washers being provided with elongated slots $j'$, Fig. 9, in which the spindles of the axle may play, and with vertically-extending ribs $j$ along the vertical edges of said slots confined between the spindles $b'$ and the inner edges of the ends $g$ of the axle-case to prevent said ends from accidentally being sprung inward and to assist in guiding the ends of said spindles. The elongated washers C being fast upon said spindles move therewith and cover up the slots $j'$ in the washers to prevent dust, &c., from entering the hub. Elastic washers K are placed between the washers C and the clips D to separate and hold them in place.

As the surfaces between the faces of the legs $b^4$ and the ends $h$ of the guide-plates H wear, the bearing-cones $E'$ may be tightened to take up said wear and the cup $e$ correspondingly tightened, thereby keeping all of the wearing parts nicely adjusted.

From the above it will be seen that the device is simple, practical, and serviceable, all of the parts being easily and readily replaced when they become injured or worn out.

I claim as new and desire to secure by Letters Patent—

1. The combination with a vertically-guided and yieldingly-supported axle having non-circular portions near its ends, of a clip engaging one of said non-circular portions and having lateral projections adapted for engagement with a suitable supporting member to prevent relative rotation of the axle with respect thereto; substantially as described.

2. The combination with a vertically-guided and yieldingly-supported axle having the lugs, $b^3$, near its ends, of a perforated clip, D, having the tangs, $d'$, engaging the lugs and the tangs, $d^2$, for engaging a suitable supporting member to prevent relative rotations of the axle with respect thereto; substantially as described.

3. The combination with a vertically-guided axle, of an axle-case having end portions upon which the bearing-cones are secured, a spring confined between the axle and axle-case and elastic rings, I, confined in said screw-threaded end portions, each of said rings having its ends overlapping one another; substantially as described.

4. The combination with an axle, of an axle-case, a spring confined between said axle and axle-case, guide-plates adapted to guide said axle vertically and having slotted side portions, $h'$, and clips, $h^2$, secured to the axle-case and seated in said slots to guide said guide-plates longitudinally upon the axle-case; substantially as described.

5. The combination with a vertically-movable axle, of an axle-case, a spring confined between said axle and axle-case, adjustable bearing-cones upon the ends of said axle-case, guide-plates longitudinally movable upon the axle-case, a clip for guiding said guide-plates longitudinally and formed with fingers engaging the cones to prevent accidental rotation thereof; substantially as described.

In witness whereof I have hereunto set my hand, at Chicago, in the county of Cook and State of Illinois, this 6th day of June, A. D. 1901.

FRANK SCHMITZ.

Witnesses:
CHAS. O. SHERVEY,
S. BLISS.